July 15, 1924.

A. M. INGE

SERVING TRAY FOR AUTOMOBILES

Filed March 15, 1922

1,501,116

WITNESSES
W. A. Williams

INVENTOR
A. M. Inge.
BY
ATTORNEYS

Patented July 15, 1924.

1,501,116

UNITED STATES PATENT OFFICE.

ARTHUR MONTGOMERY INGE, OF MEMPHIS, TENNESSEE, ASSIGNOR OF ONE-FOURTH TO WILLIAM J. BACON, ONE-FOURTH TO L. D. BEJACH, AND ONE-FOURTH TO TYLER McLAIN, ALL OF MEMPHIS, TENNESSEE.

SERVING TRAY FOR AUTOMOBILES.

Application filed March 15, 1922. Serial No. 543,884.

*To all whom it may concern:*

Be it known that I, ARTHUR M. INGE, a citizen of the United States, and a resident of Memphis, in the county of Shelby and State of Tennessee, have made certain new and useful Improvements in Serving Trays for Automobiles, of which the following is a specification.

My present invention relates generally to serving trays, and more particularly to serving trays for automobiles, my object being the provision of an apparatus which may be positioned across the upper forward portions of the automobile seats and which may have supporting engagement with the upper edges of the automobile body and at the same time, a tray, which, when removed from operative position will necessitate but small storage space.

More particularly, my invention purposes a tray which is in length but equal to a portion of the distance between the automobile sides, having a down-turned lip at one end and having a complementary U-shaped supporting frame which side arms are telescoped in lengthwise tubular bearings of the tray and whose cross bar is bent to a downward offset to engage the opposite side of the vehicle body. Means of a simple effective nature are also provided to avoid pulling the supporting frame entirely against further withdrawal in the outer effective position to prevent its accidental displacement in use.

In the accompanying drawing illustrating my present invention and forming a part of this specification:—

Referring now to these figures, my invention purposes a tray or table for automobile use, of the rectangular form shown at 10, preferably constructed of stamped sheet metal with rolled side edges and flanged ends, the latter indicated at 11. At one end the flange 11 has a down-turned lip 12.

Figure 1:
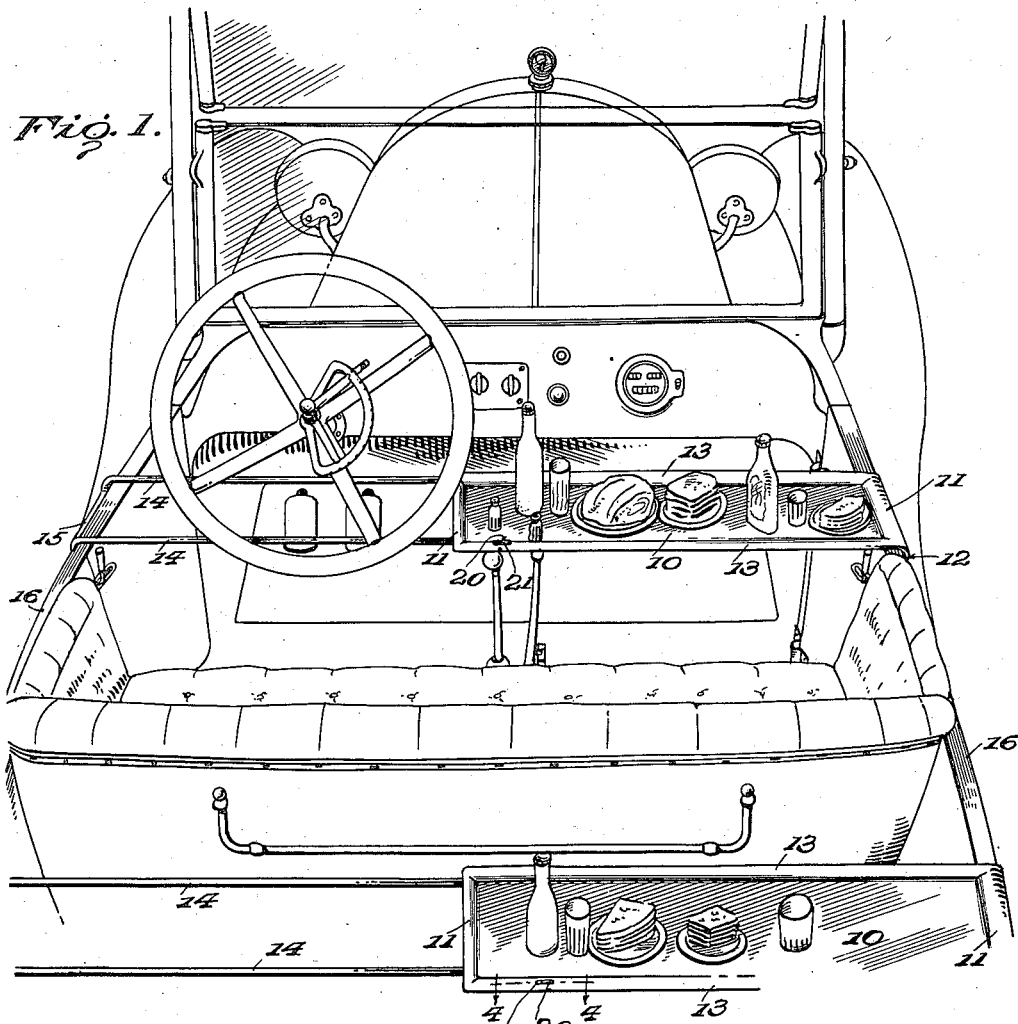
Figure 1 is a perspective view illustrating the practical application of my invention.
Figure 2:
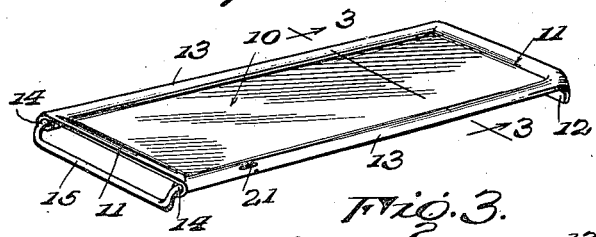
Figure 2 is a perspective view of my improved tray with the parts in collapsed position for storage.
Figure 3:
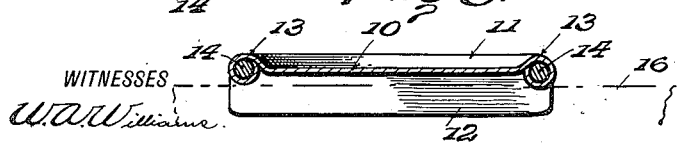
Figure 3 is a cross section taken on the line 3—3 of Figure 2.

The rolled side edges 13 form tubular bearings for the parallel spaced side bars 14 of a U-shaped supporting frame, the cross bar 15 of which frame is downwardly offset by virtue of bends in the side rods adjacent to the cross bar, as particularly seen in Figure 2, so that this downwardly offset cross bar forms in effect an engaging lip which may slip over the opposite side of the upper edge of an automobile body 16, to that which is engaged by the depending end lip 12 of the tray 10, as particularly seen in Figure 1.

Figure 4:
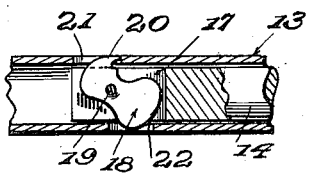
Figure 4 is an enlarged partial longitudinal section through certain of the parts with the supporting frame extended.

The free ends of the side rods 14 which are clearly slidable in the tubular side channels of the tray formed by the rolled side edges 13, have slotted inner ends, the slots 17 of each rod serving to support a pivoted gravity latch 18, as seen in Fig. 4. Each latch is pivoted on a cross pin 19 and has a rounded hook 20 at one end, its opposite end being of sufficient weight to rock this hook into a slot 21 of the respective rolled side edge 13 of the tray when, during outward movement of the supporting frame, the said ends of the latch respectively move opposite the slot 21 and a slot 22 of the respective rolled edge into the latter of which the weighted end of the latch moves. This gravity latch thus operates to prevent complete withdrawal of the supporting frame and provides for locking the same against accidental displacement with respect to the tray in the effective position shown in Figure 1 so that the apparatus when in use cannot collapse or fall at the center.

It is obvious that in the effective position the extended side rods of the supporting frame may form a support for a box or boxes and the like from which edibles are removed and placed on the tray 10, and it is further obvious that when removed from the opposite position the supporting frame may be freely shifted toward the tray 10 to the collapsed position of Fig. 2, the side rods telescoping into the tubular side channels of the tray for practically the full length of the latter without interference on the part of the gravity latches, which only function during outward movement of the supporting frame to the extended position.

I claim:—

A serving tray for automobiles having a rectangular body provided with rolled side edges forming tubular channels, and with flanged ends one of which has a down-turned engaging lip, a U-shaped supporting frame including side rods slidably disposed within the tubular channels of the tray, and a cross bar on the outer ends of the side rods, the latter of which is downwardly deflected to form an engaging lip and relatively engaging means carried by the inner ends of the side rods and the tray to secure the supporting frame in the extended position against complete withdrawal of the side rods from the channels, said means including gravity latch members pivotally mounted intermediate the ends thereof within slots in the inner ends of the side rods said members having upper inturned hooks arranged to enter slots in the upper surfaces of the rolled side edges of the tray and having their opposite ends weighted and adapted to enter lower slots of the side edges of the tray offset longitudinally with respect to the said upper slots thereof, as described.

ARTHUR MONTGOMERY INGE.